Jan. 21, 1958 R. A. LAMOUREAUX, JR 2,820,917

FOCUSSING DEVICE

Filed Feb. 23, 1954 5 Sheets-Sheet 1

INVENTOR.
RAYMOND A. LAMOUREAUX, JR.
BY Connolly and Hutz
HIS ATTORNEYS

Jan. 21, 1958 R. A. LAMOUREAUX, JR 2,820,917

FOCUSSING DEVICE

Filed Feb. 23, 1954 5 Sheets-Sheet 2

INVENTOR.
RAYMOND A. LAMOUREAUX, JR.
BY Connolly and Hutz
HIS ATTORNEYS

Jan. 21, 1958 R. A. LAMOUREAUX, JR 2,820,917

FOCUSSING DEVICE

Filed Feb. 23, 1954 5 Sheets-Sheet 3

INVENTOR.
RAYMOND A. LAMOUREAUX, JR.
BY Connolly and Hutz
HIS ATTORNEYS

Jan. 21, 1958 R. A. LAMOUREAUX, JR 2,820,917

FOCUSSING DEVICE

Filed Feb. 23, 1954 5 Sheets-Sheet 4

INVENTOR.
RAYMOND A. LAMOUREAOUX, JR
BY Connolly and Hutz
HIS ATTORNEYS

FOCUSSING DEVICE

Filed Feb. 23, 1954 5 Sheets-Sheet 5

INVENTOR.
RAYMOND A. LAMOUREAUX, JR.
BY Connolly and Hutz
HIS ATTORNEYS 2,820,917
Patented Jan. 21, 1958

2,820,917

FOCUSSING DEVICE

Raymond A. Lamoureaux, Jr., North Adams, Mass., assignor to Sprague Electric Company, North Adams, Mass., a corporation of Massachusetts Application February 23, 1954, Serial No. 411,994

3 Claims. (Cl. 313—84)

This invention relates to focussing devices and particularly to focussing structures for large size television picture tubes and for color television tubes.

There has been a very rapid change and development in the television industry and particularly in regard to television receivers the viewing tubes of which, over the past decade, have increased in size from the early 7 inch type to tubes ranging in size to from 24 to 27 inches. This has created increasingly troublesome focussing problems. Furthermore, as the television industry enters into a new era of color transmission, one of the problems confronting television engineers is the inability of the known focussing devices to accurately register the far more electronically complex transmitted intelligence on the viewing face of the picture tube.

A further difficulty associated with the viewing problem is the susceptibility of factory pre-set focussing devices to defocus during shipment to and operation by the consumer. In view of the mechanical complexity of present day television receivers, the manufacturers have deemed it desirable to pre-set the variables within the receiver at the factory so as to avoid major adjustments by the retailer when he places the set in the buyer's home. However, focussing mechanisms are quite susceptible to displacement, not only during shipment but during the receiver's operational life due to surrounding mechanical disturbances (washing machines, trains, etc.). The inherent costliness of the color receivers over and above their black and white predecessors thus makes it extremely desirable for the manufacturer to use components which are extremely rigid, and at the same time, are relatively inexpensive to produce.

A further difficulty associated with present day television focussing devices is that presently used magnetic materials essential in the focussing mechanism, such as alnico and magnetized powdered iron, fail to properly focus the picture at the periphery of the large-sized viewing tubes since they do not provide sufficiently strong magnetic fields.

One object of this invention, therefore, is to provide a focussing device for television tubes which can accurately register the transmitted intelligence on the face of the picture tube.

Another object of this invention is to provide a focussing device which rigidly holds the picture tube in pre-focussed position during shipment and use.

Another object of this invention is to provide a focussing device which is adapted to accurately hold standard size magnetic toroids in position around the neck of a television tube.

Figure 1:
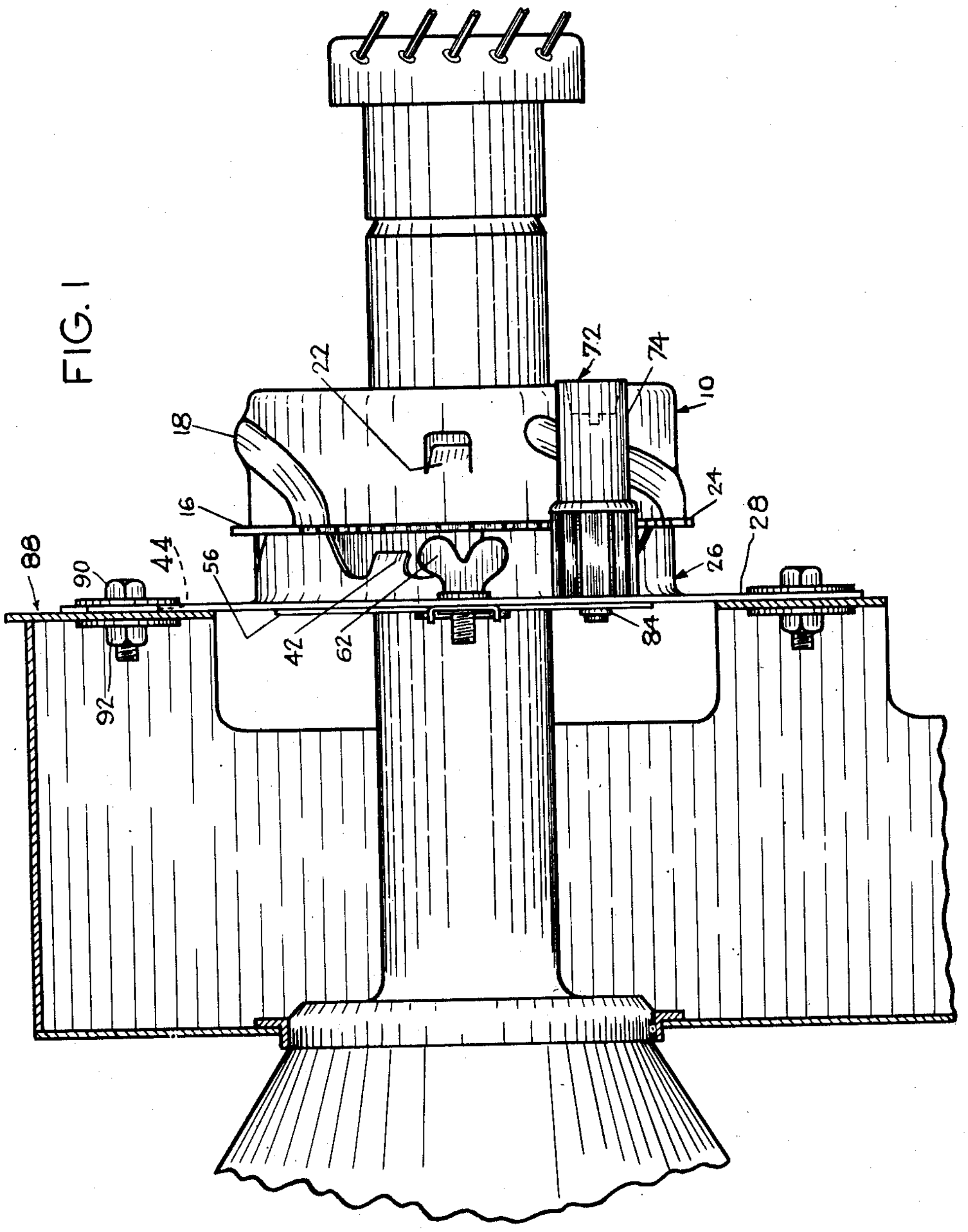
Figure 2:
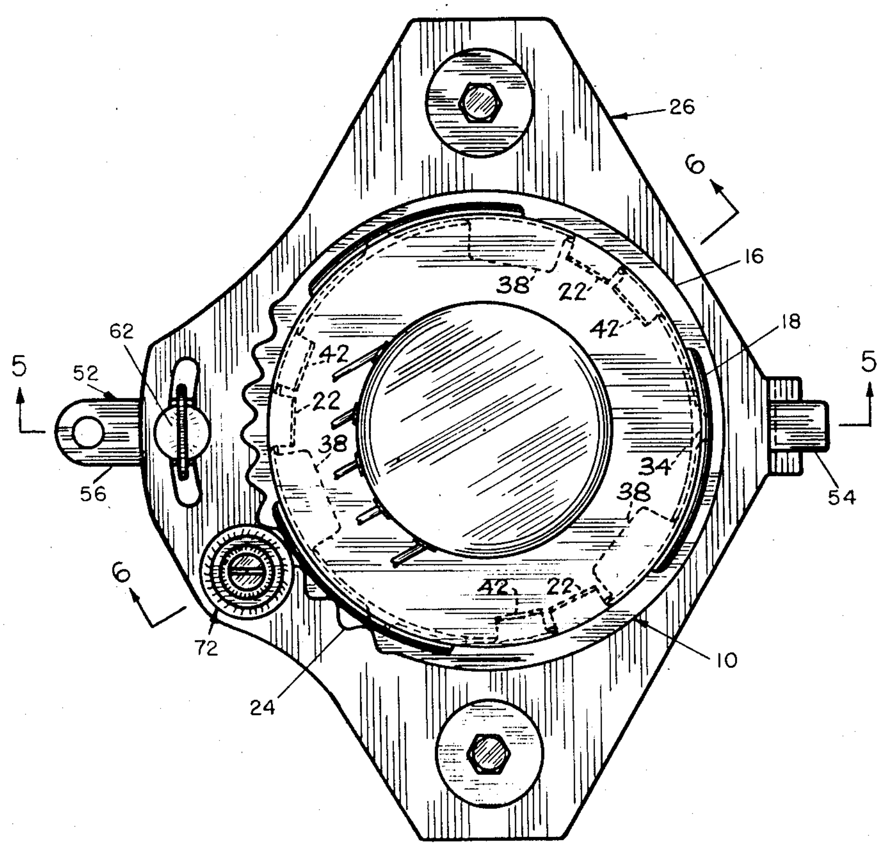
Figure 3:
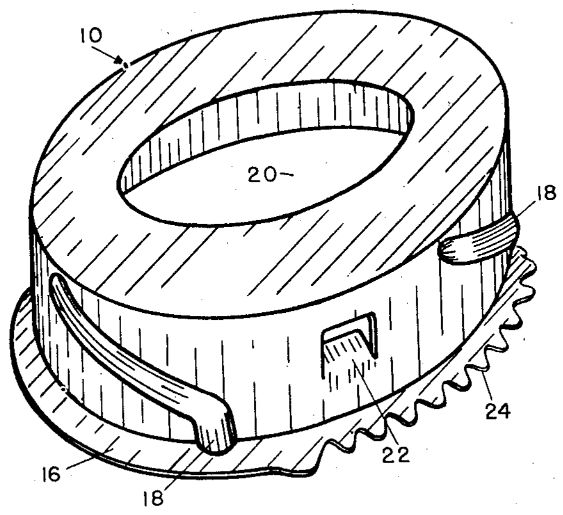
Figure 4:
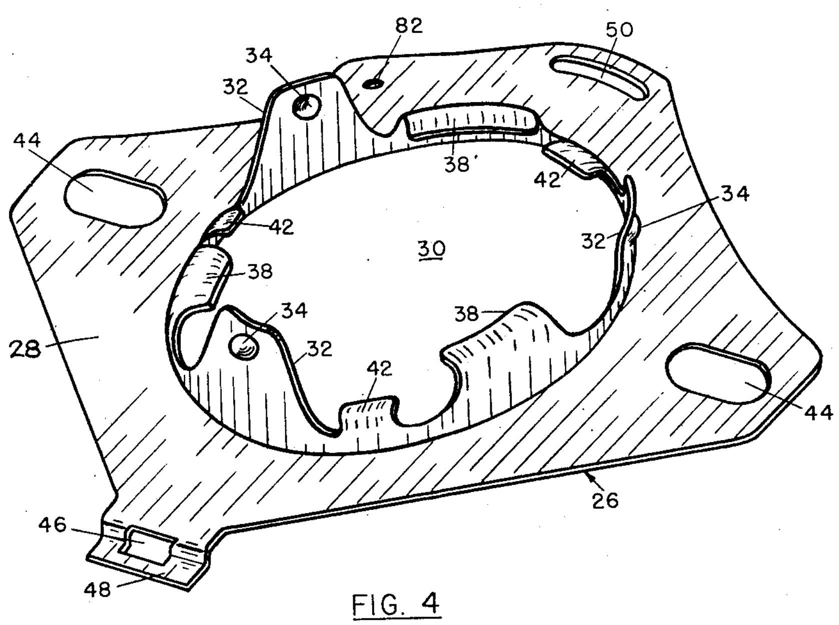
Figure 5:
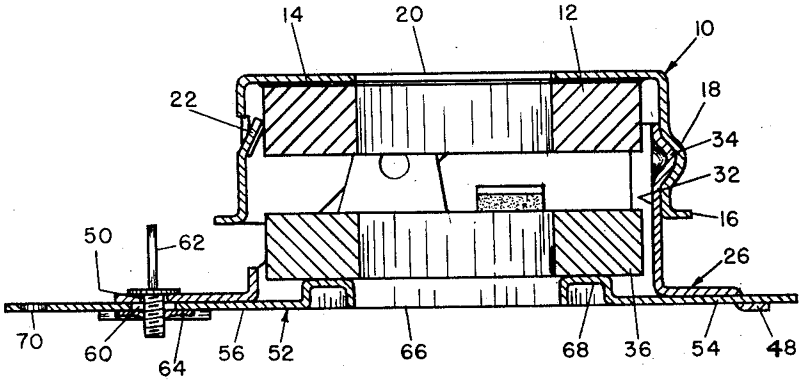
Figure 6:
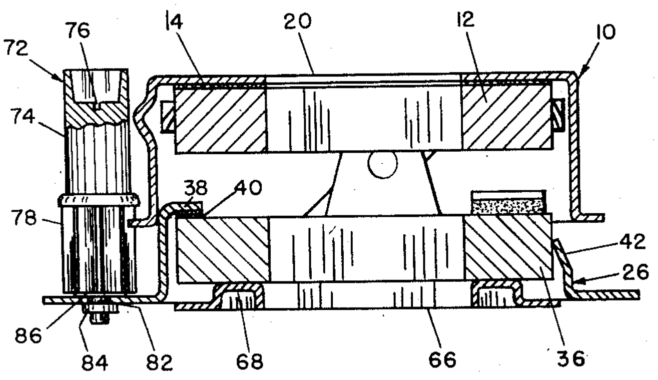
Figure 8:
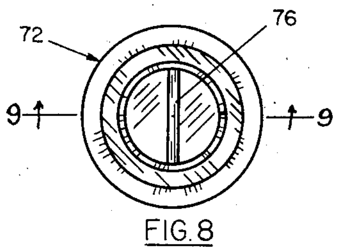
Figure 9:
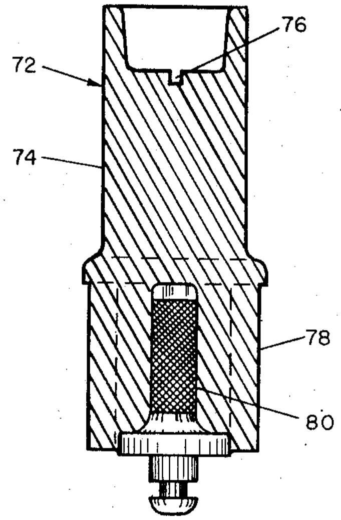
Figure 7:
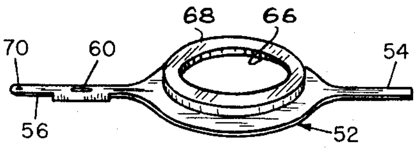
Figure 10:
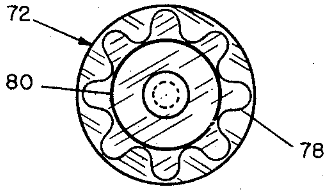
Figure 11:
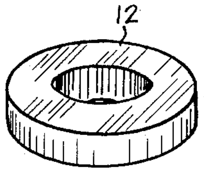

Other objects and many of the attendant advantages of this invention will be readily appreciated as the same becomes better understood by reference to the following detailed description when considered in connection with the accompanying drawings wherein:

Fig. 1 is a side elevational view of the focussing device of this invention in position on a television tube, Fig. 2 is a front view of the focussing device shown in Fig. 1, Fig. 3 is a perspective view of the top cup section of the focussing mechanism, Fig. 4 is a perspective view of the base section of the focussing mechanism, Fig. 5 is a cross-sectional view of the focussing mechanism taken along the line 5—5 of Fig. 2 but omitting the neck of the television tube, Fig. 6 is a cross-sectional view taken on line 6—6 of Fig. 2, Fig. 7 is a perspective view of the centering plate, Fig. 8 is a top plan view of the actuating gear assembly, Fig. 9 is a longitudinal sectional view of the actuating gear assembly, taken on line 9—9 of Fig. 8, Fig. 10 is a bottom plan view of the actuating gear assembly, Fig. 11 is a perspective view of a magnetic toroid used in the focussing mechanism.

This invention, briefly, is concerned with the production of a focussing device comprising two concentrically positioned toroids of magnetic material, each of which is mounted in adjustable retaining means. The retaining means cooperate to vary the spacing between the toroids while yet maintaining the adjacent faces of the toroids parallel to all positions of adjustment. Gear structure is provided both to actuate the adjustment means and to rigidly position the retaining means in their positions of adjustment. The retaining means for the two magnetic toroids, which acts to provide the desired adjustment between the toroids, comprises a base plate in which one of the two magnetic toroids is positioned, and a top cup in which the other of the magnetic toroids is positioned, there being means for adjusting the top cup axially with respect to the base plate so as to vary the distance between the magnetic toroids while maintaining the adjacent surfaces parallel until the desired field is obtained.

Referring now in greater detail to the drawings wherein similar reference characters refer to similar parts there is shown a top cup generally designated 10 in which one of the magnetic toroids 12 best shown in Fig. 11, is positioned and to which it is bonded by cement or the like indicated at 14. The top cup 10 has an outwardly turned flange 16, at the open end of the cup and extending upwardly along the sides of the cup from a point adjacent the flange 16, is an interrupted screw thread comprising three spaced, helical embossments 18 which form an integral part of the adjusting mechanism of the structure. The closed end of the cup is provided with a central opening 20, for positioning the focussing device upon the neck of a television tube. In assembling the top cup portion, magnetic toroid 12 is placed in the open end of the top cup and forced inwardly against the centering tabs 22 of which there are at least three. These centering tabs 22 serve the function of positioning the toroid 12 coaxially with the opening 20 in the closed end of the top cup. A plunger is used to force the magnetic toroid into the top cup, the centering tabs 22 exerting a force inwardly against the toroid during its insertion so as to properly position it. The toroid's upward travel is limited by its upper surface contacting the inner surface of the closed end of the top cup. When the upper surface of the toroid contacts the inner surface of the top cup, the lower surface of the toroid is in such position that it will be parallel to the adjacent surface of the second toroid which is held within the base portion, as will hereafter be explained. The cement 14 then bonds the toroid in this position, which position is further maintained by the inward pressure of the centering tabs 22. On the outwardly turned flange 16 at the open end of the top cup are a series of gear teeth 24 which cooperate with the gear assembly, which will be discussed later, to move the top cup axially, while maintaining direct parallelism with the baseplate member generally designated 26.

The base plate member 26 consists of a flat plate 28 having upwardly turned projections about a central opening 30, which opening serves as a passageway for receiving the neck of the television tube. Three of the upwardly turned projections constitute the guide tabs 32, each being provided with a dimple 34. The dimples 34 cooperate with the helical embossments 18 of the top cup to provide an axial adjustment of the top cup relative to the base plate in such a manner that the opposed surfaces of the magnetic toroids positioned respectively within the top cup and base plate remain parallel during the entire adjustment. The second magnetic toroid 36 is positioned between the tabs 32 and is inserted in such a manner that the upper surface of the toroid 36 is pressed against each of the bottoming tabs 38 thus insuring the proper positioning of the upper surface of the toroid 36, with respect to the lower surface of the toroid 12. Cement 40 is placed on the under side of the bottoming tabs 38 so as to bond the toroid to the base plate. Equally spaced about the periphery of the central opening 30 in the base plate are three centering tabs 42 which serve to concentrically position the toroid 36 with respect to the toroid 12. As the toroid 36 is forced into the opening of the base plate, the inwardly extending centering tabs concentrically direct it, and thereafter serve to maintain it in proper position until the toroid is satisfactorily cemented to the lower surface of the bottoming tabs 38. On the flanged portion of the base plate are two mounting holes 44 which are positioned in opposed relationship and serve as means for the connection between the focussing device and the television tube. Also on the flanged section of the baseplate are two other openings, one being an opening 46 formed in off-set tab 48 and the other being an elongated radial slot 50, both of these openings 46 and 50 serving as mounting and adjusting means for the centering plate generally designated 52. This centering plate 52 consists of a generally circular piece of metal having two extended arms 54 and 56, the arm 54 being adapted to extend through the slot 46 in tab 48 and the arm 56 having an opening 60 which is adapted to mate with slot 50 to receive a set-screw or the like. This centering plate is used to properly center the received picture upon the television tube screen. Centrally located in the centering plate and bounding a circular central opening 66, coaxial with the central openings in the two toroids, is an embossment or rib 68. This embossment or rib 68 is kept in intimate contact with the under side of the second magnetic toroid 36 so as to effect improved focussing over that which would result if the centering plate were not in direct contact with one of the magnetic toroids. The arm 54 of the centering plate is inserted during assembly, into the slot 46 in tab 48, the offset configuration of which has the effect of exerting a spring tension against the arm 54, thereby preventing any tendency to shift from position. The opening 60 in the arm 56 of the centering plate cooperates with slot 50 and screw 62 to provide securing means for locking the centering plate in that position at which the received intelligence is projected upon the center of the television receiving tube. An opening 70 at the end of the arm 56 of the centering plate serves, when desired, as an engagement means for a detachable lever or the like used in adjusting the centering plate when centering the picture. After the picture has been centered, the centering plate is secured to the rest of the focussing device by means of the thumb screw 62.

Figs. 8, 9 and 10 illustrate the gear assembly, generally designated 72, which serves to adjust the top cup 10 to the desired position with respect to the base plate member 26. The gear assembly 72 comprises a shaft 74 in the top of which there is provided a screw driver slot 76 which serves to engage a screw driver or the like used as a gear driving means; although it must be realized that such structure is susceptible to numerous variations, such as providing the adjusting end with a flexible shaft for hand manipulation, or adapting the shaft for use with still other types of driving means which may be either adjacent to or removed from the television focussing device. On the opposite end of the gear assembly to that of the screw driver slot 76 are gear teeth 78 which serve as the driving means for the gear teeth 24 at the flanged open end of the top cup. The gear assembly is connected to the base plate assembly 26 by a flanged, knurled insert 80 extending into a lower opening in the shaft 74. This insert is secured to the base plate by projecting it through an opening 82 in the base plate, the gear assembly being retained in position by means of a nut 84 and a spring washer 86 which is placed about the end of the insert.

Fig. 1 illustrates the assembled television focussing device. It shows how the mounting holes 44 are used for securing the complete assembly and, if desired, the neck of the television tube to the chassis generally indicated at 88 by means of the bolts 90 and nuts 92.

Although this apparatus is suitable for use with toroids constructed of various magnetic materials, it has been found that a toroid made of one particular type of material exerts such magnetic force that it has become quite desirable for use with large size television tubes and, additionally, has such magnetic characteristics that is highly desirable for use with color television. This material is a ferrite, more particularly barium ferrite, which has been permanently magnetized after sintering and subsequent formation into the desired dimensions. Discussions of this magnetic material have appeared in various publications of recent years and the material is completely described in an article by J. J. Went et al., in the Phillips Technical Review, 13, 7, pages 194–208, dated January 1952, entitled "Ferroxdur," a class of new permanent magnet materials. This magnetized barium ferrite when incorporated in the structure so far discussed forms a preferred embodiment of the invention. The production techniques associated with the fabrication of these barium ferrite toroids involve great accuracy and fine tolerances and it has been the custom in the past to accurately and painstakingly machine these structures so as to obtain these fine tolerances. This procedure, however, is costly and time-consuming and is desirably eliminated by compensating for any variations in the physical dimension of the toroids by suitable adjustment means, such as described above. It has been established that the apparatus comprising this invention tolerates much larger variations in physical dimension than hitherto believed possible, while still retaining the precise magnetic characteristics and rigidity required by the industry.

For proper focussing of this type of device, it is of primary importance that the opposed surfaces of the magnetic toroids be maintained at maximum parallelism throughout their adjustment relative to one another in order to avoid distortion of the image. This has been accomplished by the compressive positioning of the upper toroid in the top cup with the assistance of the centering tabs and the securing of it at that position wherein its upper surface initially contacts the inner surface of the closed end of the top cup. By securing the upper toroid at such a position, and by similarly securing the bottom toroid to the tabs 38, it is assured that the opposed surfaces of the toroids in the assembled structure will define parallel planes. The bottoming tabs 38 of the base plate are shown to be parallel to the outwardly turned flange of the top cup when the assembly is completed, while the flange is shown to be parallel to the bottom side of the toroid positioned in the top cup. At the time the magnetic toroid 36 is placed in the base plate and secured against the three inwardly flanged portions of the bottoming tabs, the centering tabs serve to position it coaxially with the upper toroid so that the unit can be easily placed on the neck of the television tube. After the positioning of the toroids in their respective retaining members, assembly of the structure is accomplished by placing the dimples 34 of the guide tabs 32 of the base plate into their respective helical embossments of the top cup. The dimples 34 threadedly cooperate with their respective helical embossments to maintain maximum parallelism of the adjacent faces of the toroids. The dimpled guide tabs 32 also exert an outward pressure so that any movement of the top cup with respect to the base plate necessitates the imposition of a substantial force, this insuring that vibration or other physical disturbances will not alter the final setting of the top cup with respect to the base plate. The three spaced guide tabs insure that little or no transverse movement of one member will occur with respect to the other.

To further insure against the above mentioned transverse movement, the invention incorporates an additional feature present in the gear assembly, this additional feature comprising the spring washer and nut and bolt connection for the gear shaft. It was first thought possible to use a rigid assembly; however, it was soon realized that this rigid type of assembly would involve an inability to withstand continued shock and vibration without relative movement of the elements. It has been found that the spring washer and nut and bolt arrangement obviates this difficulty. Furthermore, this type of arrangement facilitates the assembly of the device and make possible easy dismantling when desired, while the use of the spring washer provides for the exertion of a strong pressure to avoid the tendency of the gear assembly to move. By insuring positioning of the gear assembly in one place by means of the force exerted by the spring washer, the gear assembly also serves to maintain the positioning of the top cup with respect to the base plate.

It should also be noted that the extending arms 54 and 56 are provided with sufficient spring pressure to accomplish the important contact between the circular base 68 and the lower toroid and also to mechanically secure the centering plate, when anchored after final adjustment.

Obviously many modifications and variations of the present invention are possible in the light of the above teachings. It is, therefore, to be understood that within the scope of the appended claims the invention may be practiced otherwise than as specifically described.

What is claimed as the invention is:

1. A focussing device for television tubes comprising a generally cylindrical supporting structure having two sections axially movable relative to each other, a first toroidal permanent magnet member securely positioned within one of said sections and a second toroidal permanent magnet member securely positioned in the other of said sections, each of said sections as well as each of said magnetic members having axial openings therein of a size and shape suitable to embrace the neck of a television tube, and adjustment means connected for moving one of said sections in an axial direction relative to the other section.

2. The device of claim 1 wherein both of said magnet members are barium ferrite which is permanently magnetized.

3. The device of claim 1 wherein at least one section is generally cup-shaped with an internal diameter larger than the external diameter of its magnet member and has inwardly projecting guide detents frictionally engaging and firmly holding its magnet member in axial alignment.

References Cited in the file of this patent

UNITED STATES PATENTS

| | | |
|---|---|---|
| 2,219,193 | Mynall | Oct. 22, 1940 |
| 2,416,687 | Fry | Mar. 4, 1947 |
| 2,418,487 | Sproul | Apr. 8, 1947 |
| 2,580,606 | Schiel et al. | Jan. 1, 1952 |
| 2,581,657 | Heppner | Jan. 8, 1952 |
| 2,740,064 | Birkbeck | Mar. 27, 1956 |

FOREIGN PATENTS

| | | |
|---|---|---|
| 676,629 | Great Britain | July 30, 1952 |

OTHER REFERENCES

Went et al.: "Phillips Technical Review," vol. 13, No. 7, January 1952, pp. 194–208.